(12) United States Patent
Oono et al.

(10) Patent No.: US 8,270,005 B2
(45) Date of Patent: Sep. 18, 2012

(54) WIRELESS COMMUNICATION DEVICE, COMPUTER READABLE MEDIUM STORING WIRELESS COMMUNICATION PROGRAM, WIRELESS COMMUNICATION SYSTEM, IMAGE FORMATION DEVICE, AND COMPUTER READABLE MEDIUM STORING CONTROL PROGRAM FOR IMAGE FORMATION DEVICE

(75) Inventors: Yoshihito Oono, Saitama (JP); Hiroshi Shiraku, Saitama (JP); Makoto Oshiumi, Saitama (JP); Hiroshi Doi, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1190 days.

(21) Appl. No.: 11/724,238

(22) Filed: Mar. 15, 2007

(65) Prior Publication Data
US 2008/0055631 A1 Mar. 6, 2008

(30) Foreign Application Priority Data

Sep. 4, 2006 (JP) .................................. 2006-238903

(51) Int. Cl.
*G06F 3/12* (2006.01)
(52) U.S. Cl. ............... 358/1.15; 358/1.13; 358/1.14; 370/338; 709/227; 709/228
(58) Field of Classification Search .................. None
See application file for complete search history.

(56) References Cited

U.S. PATENT DOCUMENTS

| | | | |
|---|---|---|---|
| 7,123,375 B2* | 10/2006 | Nobutani et al. | 358/1.15 |
| 7,317,712 B2* | 1/2008 | Ishimura | 370/338 |
| 7,463,378 B2* | 12/2008 | Williams et al. | 358/1.15 |
| 7,580,398 B2* | 8/2009 | Nakamura | 370/338 |
| 7,634,670 B2* | 12/2009 | Nago et al. | 713/300 |
| 7,689,725 B2* | 3/2010 | Nakamura | 710/8 |
| 8,161,170 B2* | 4/2012 | Nakamura | 709/228 |
| 2004/0046991 A1* | 3/2004 | Kim | 358/1.15 |
| 2005/0157329 A1* | 7/2005 | Park et al. | 358/1.15 |
| 2006/0002352 A1* | 1/2006 | Nakamura | 370/338 |
| 2006/0055964 A1* | 3/2006 | Tsuchitani | 358/1.15 |
| 2006/0200564 A1* | 9/2006 | Watanabe et al. | 709/227 |
| 2007/0171877 A1* | 7/2007 | Hasegawa et al. | 370/338 |

FOREIGN PATENT DOCUMENTS

JP A-2004-328288 11/2004
JP A 2005-192202 7/2005

OTHER PUBLICATIONS

Sep. 27, 2011 Office Action issued in Japanese Patent Application No. 2006-238903 (with translation).

* cited by examiner

*Primary Examiner* — Dung Tran
(74) *Attorney, Agent, or Firm* — Oliff & Berridge, PLC

(57) ABSTRACT

A wireless communication device comprises a wireless communication unit that performs wireless communication; a connector that enables exchange of a signal with an information processing device; an acquisition unit that acquires setting information when an information processing device connected to the connector uses the wireless communication unit based on the setting information stored in the information processing device; a storing unit that stores the setting information acquired by the acquisition unit; and a communication processing unit that performs communication processing by using the wireless communication unit based on the setting information stored by the storing unit.

8 Claims, 8 Drawing Sheets

WIRELESS COMMUNICATION DEVICE, COMPUTER READABLE MEDIUM STORING WIRELESS COMMUNICATION PROGRAM, WIRELESS COMMUNICATION SYSTEM, IMAGE FORMATION DEVICE, AND COMPUTER READABLE MEDIUM STORING CONTROL PROGRAM FOR IMAGE FORMATION DEVICE

CROSS-REFERENCE TO RELATED APPLICATIONS

This application is based on and claims priority under 35 USC 119 from Japanese patent application no. 2006-238903 filed Sep. 4, 2006.

BACKGROUND OF THE INVENTION

1. Field of the Invention

The present invention relates to a wireless communication device, a computer readable medium storing a wireless communication program, a wireless communication system, an image formation device, and a computer readable medium storing a control program for an image formation device.

2. Description of the Related Art

Recently, there have been increased opportunities to utilize wireless communication using radio waves or the like. For example, there have been proposed various devices communicable with a wireless access point operating as a base station, and these devices include personal computers, printers, scanners, and hard disk drives.

For wireless communication between a wireless access point and those devices as mentioned above, it is a general practice to use an encryption method using ESS-ID (Extended Service Set Identifier) or WEP (Wired Equivalent Privacy) key, or identification information including a password. Therefore, both the wireless access point and the wireless communication devices including equipment for communicating with the wireless access point are required to set therein such identification information as setting information.

SUMMARY OF THE INVENTION

According to an aspect the present invention, there is provided a wireless communication device comprising a wireless communication unit that performs wireless communication; a connector that enables exchange of a signal with an information processing device; an acquisition unit that acquires setting information when an information processing device connected to the connector uses the wireless communication unit based on the setting information stored in the information processing device; a storing unit that stores the setting information acquired by the acquisition unit; and a communication processing unit that performs communication processed by using the wireless communication unit based on the setting information stored by the storing unit.

BRIEF DESCRIPTION OF THE DRAWINGS

Exemplary embodiments of the present invention will be described in detail based on the following figures, wherein.

DETAILED DESCRIPTION

Referring to the accompanying drawings, a detailed description will be made of a wireless communication device, a computer readable medium storing a wireless communication program, a wireless communication system, an image formation device, and a computer readable medium storing a control program for an image formation device, according to the exemplary embodiments of the present invention.

Exemplary Embodiment 1

Figure 1:
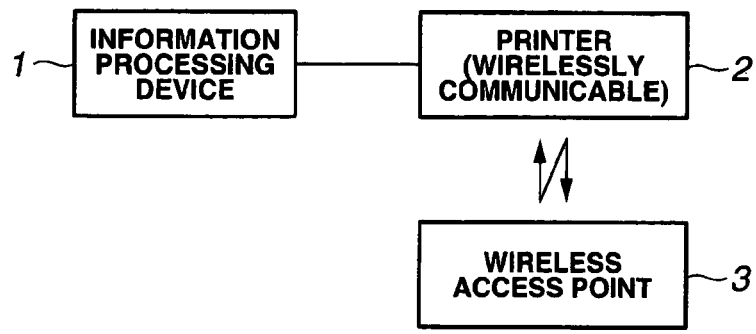
FIG. 1 is a diagram for explaining an outline of an exemplary embodiment 1 of the present invention.

FIG. 1 is a diagram for explaining an outline of an exemplary embodiment 1. Referring to FIG. 1, according to the exemplary embodiment 1, an information processing device 1 such as a personal computer is connected to a printer 2 to which the present invention is applied, so that the printer 2 is able to perform wireless communication with a wireless access point 3.

Figure 2:
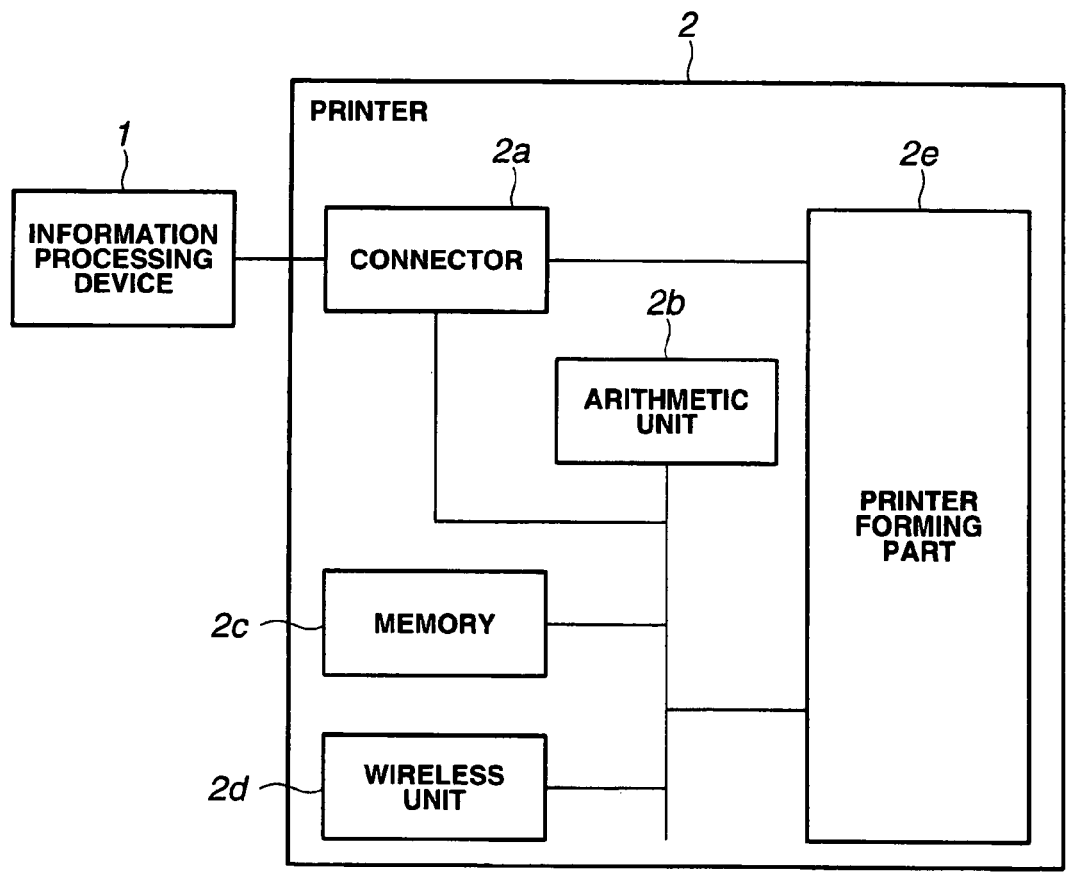
FIG. 2 is a block diagram illustrating configuration of a printer 2.

Configuration of the printer 2 will now be described. FIG. 2 is a block diagram illustrating configuration of the printer 2. Referring to FIG. 2, the printer 2 includes a connector 2a, an arithmetic unit 2b, a memory 2c, a wireless unit 2d, and a printer forming part 2e.

The connector 2a is an interface connecting between the information processing device 1 and the printer 2. The arithmetic unit 2b is for performing arithmetic processing, and is realized by a processor such as a CPU (Central Processing Unit). The memory 2c is for storing information or the like, and is realized by a memory such as a ROM (Read Only Memory), RAM (Random Access Memory), or nonvolatile memory, or a magnetic disk. The wireless unit 2d is for performing wireless communication with the wireless access point 3 or the like, and includes an antenna, a transmission/reception circuit and so on. The printer forming part 2e includes typical components forming a printer. The printer 2 realizes the functions as described below by operating the arithmetic unit 2b in accordance with a program stored in the memory 2c.

The program stored in the memory 2c can be provided by storing the same in various memories or storage media such as an optical disk, or by distributing the same through a communication line.

Figure 3:
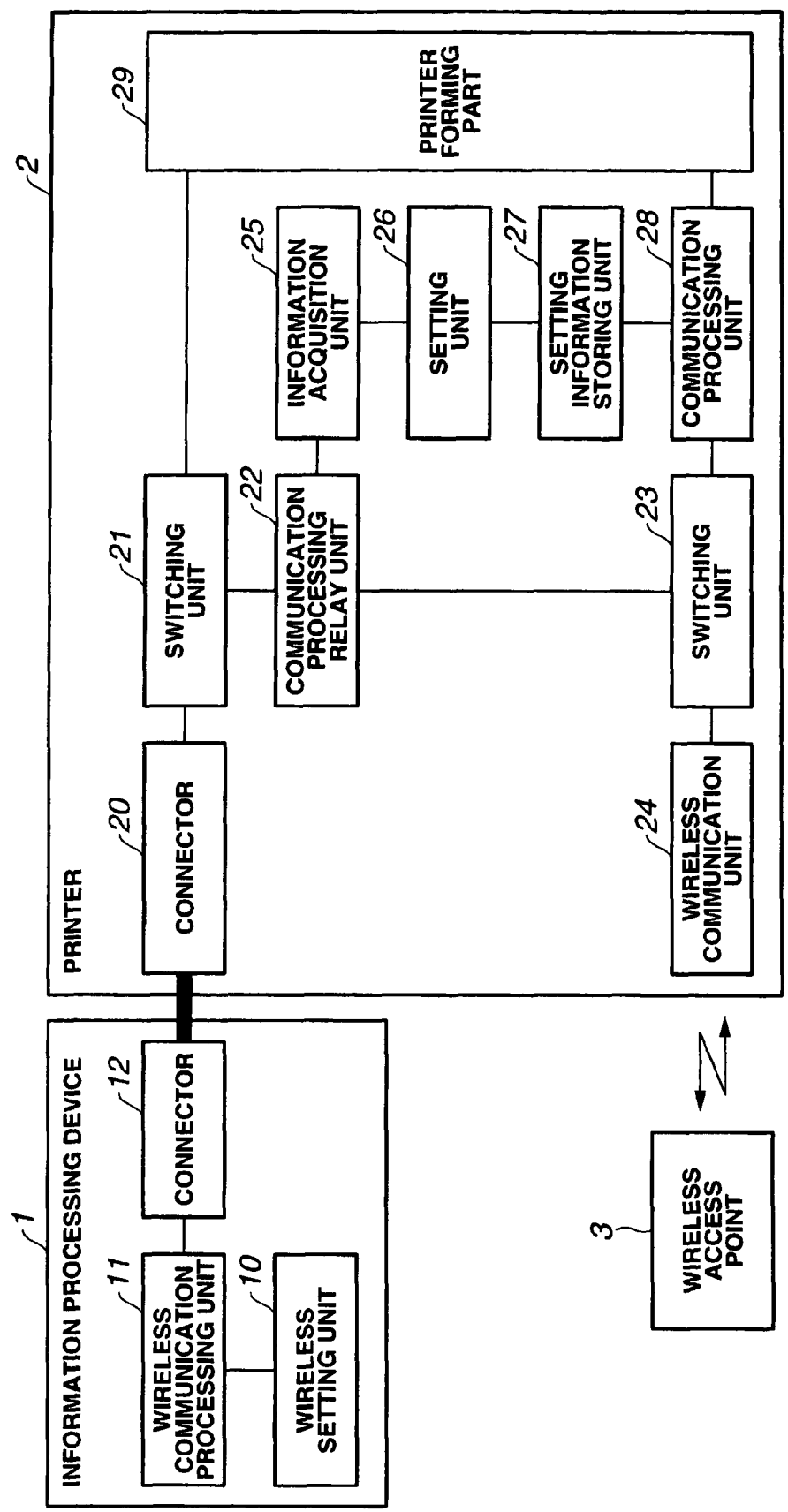
FIG. 3 is a block diagram illustrating functional configuration of the printer 2.

FIG. 3 is a block diagram illustrating functional configuration of the printer 2. As shown in FIG. 3, the printer 2 has a connector 20, a switching unit 21, a communication processing relay unit 22, a switching unit 23, a wireless communication unit 24, an information acquisition unit 25, a setting unit 26, a setting information storing unit 27, a communication processing unit 28, and a printer forming part 29. The information processing device 1 has a wireless setting unit 10, a wireless communication processing unit 11, and a connector 12.

The connector 20 is an interface for connecting to the connector 12 of the information processing device 1. The switching unit 21 is for switching the connection with the information processing device 1 via the connector 20 between the communication processing relay unit 22 and the printer forming part 29. When the connection is switched to the communication processing relay unit 22, the information processing device 1 is allowed to perform wireless communication. When switched to the printer forming part 29, the information processing device 1 is allowed to use the printer. The switching unit 21 may be a mechanical switch or a switch operating on software.

Figure 4:
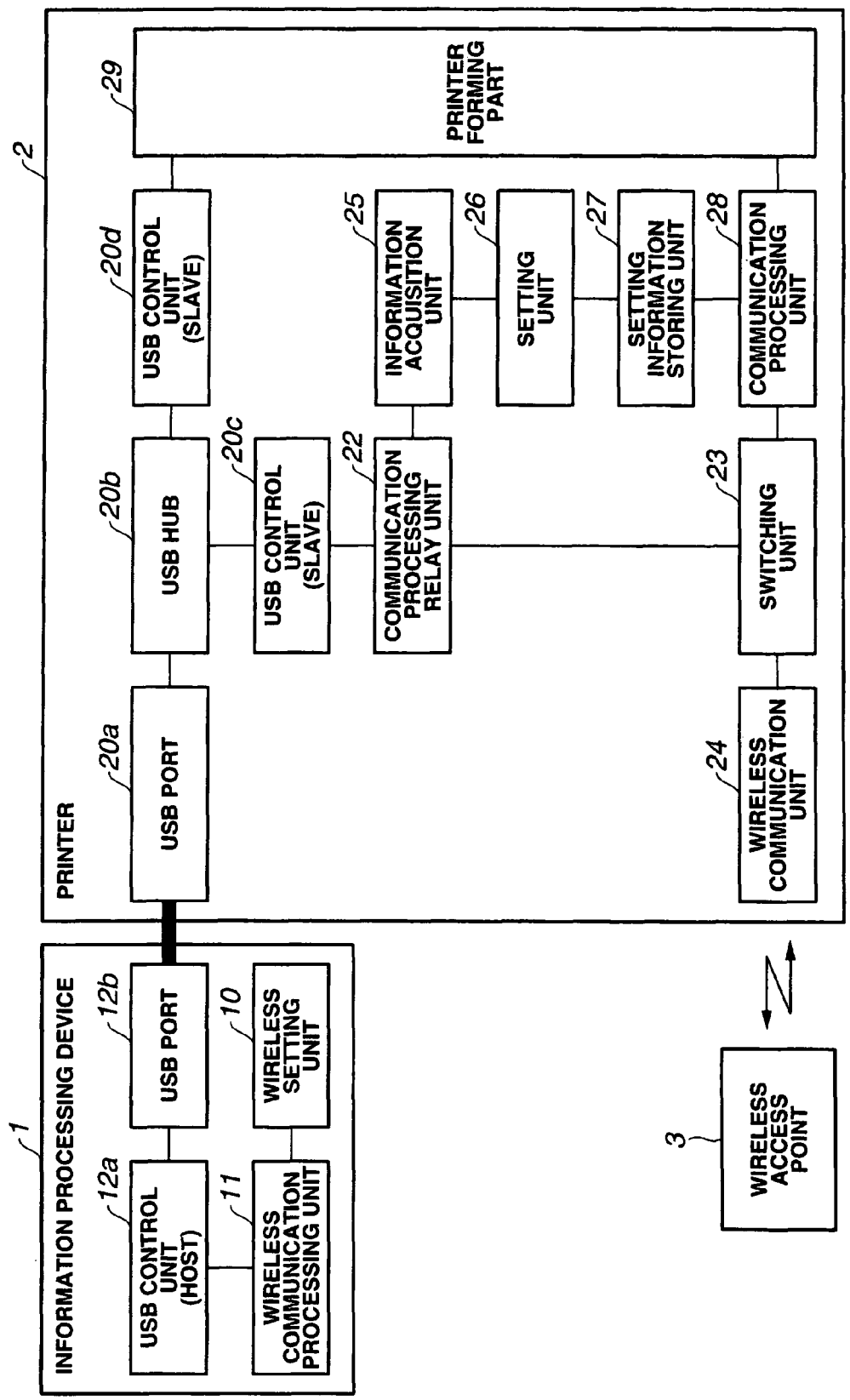
FIG. 4 is a block diagram illustrating configuration when a USB is employed for a connector 12 and a connector 20.

When a USB (Universal Serial Bus) is employed for the connector 12 and the connector 20, as shown in FIG. 4, the information processing device 1 is provided with a USB control unit (host side) 12a and a USB port 12b, while the printer 2 is provided with a USB port 20a, a USB hub 20b, a USB control unit (slave side) 20c, and a USB control unit (slave side) 20d. In this case, the information processing device 1 is allowed to use both the wireless communication and the printer without the need of the switching unit 21.

The information processing device 1 is not necessarily be able to utilize the printer forming part 29. Therefore, the switching unit 21 may be omitted, and the connector 20 may be directly connected to the communication processing relay unit 22. The communication processing relay unit 22 is activated when the information processing device 1 uses the wireless communication unit 24. The communication processing relay unit 22 causes the wireless communication unit 24 to operate based on setting information such as a WEP key or ESS-ID output by the wireless communication processing unit 11 of the information processing device 1, so that the information processing device 1 is allowed to perform wireless communication with the wireless access point 3 by using the wireless communication unit 24. The setting information output by the wireless communication processing unit 11 of the information processing device 1 is set by the wireless setting unit 10 and stored by the wireless communication processing unit 11.

When the information processing device 1 performs wireless communication by using the wireless communication unit 24, the information acquisition unit 25 acquires setting information such as a WEP key or ESS-ID used for the wireless communication. The setting unit 26 causes the setting information storing unit 27 to store the setting information acquired by the information acquisition unit 25.

The communication processing unit 28 operates when the printer forming part 29 uses the wireless communication unit 24. The communication processing unit 28 causes the wireless communication unit 24 to operate based on the setting information stored by the setting information storing unit 27, so that the printer forming part 29 is allowed to perform wireless communication with the wireless access point 3 by using the wireless communication unit 24.

The switching unit 23 switches the connection with the wireless communication unit 24 between the communication processing relay unit 22 and the communication processing unit 28. This switching unit 23 may be a mechanical switch or a switch operating on software. The wireless communication unit 24 performs wireless communication with the wireless access point 3 with the use of setting information. When the information processing device 1 uses the wireless communication unit 24, the wireless communication unit 24 utilizes setting information output by the wireless communication processing unit 11. When the printer forming part 29 uses the wireless communication unit 24, the wireless communication unit 24 utilizes setting information stored by the setting information storing unit 27.

Figure 5:
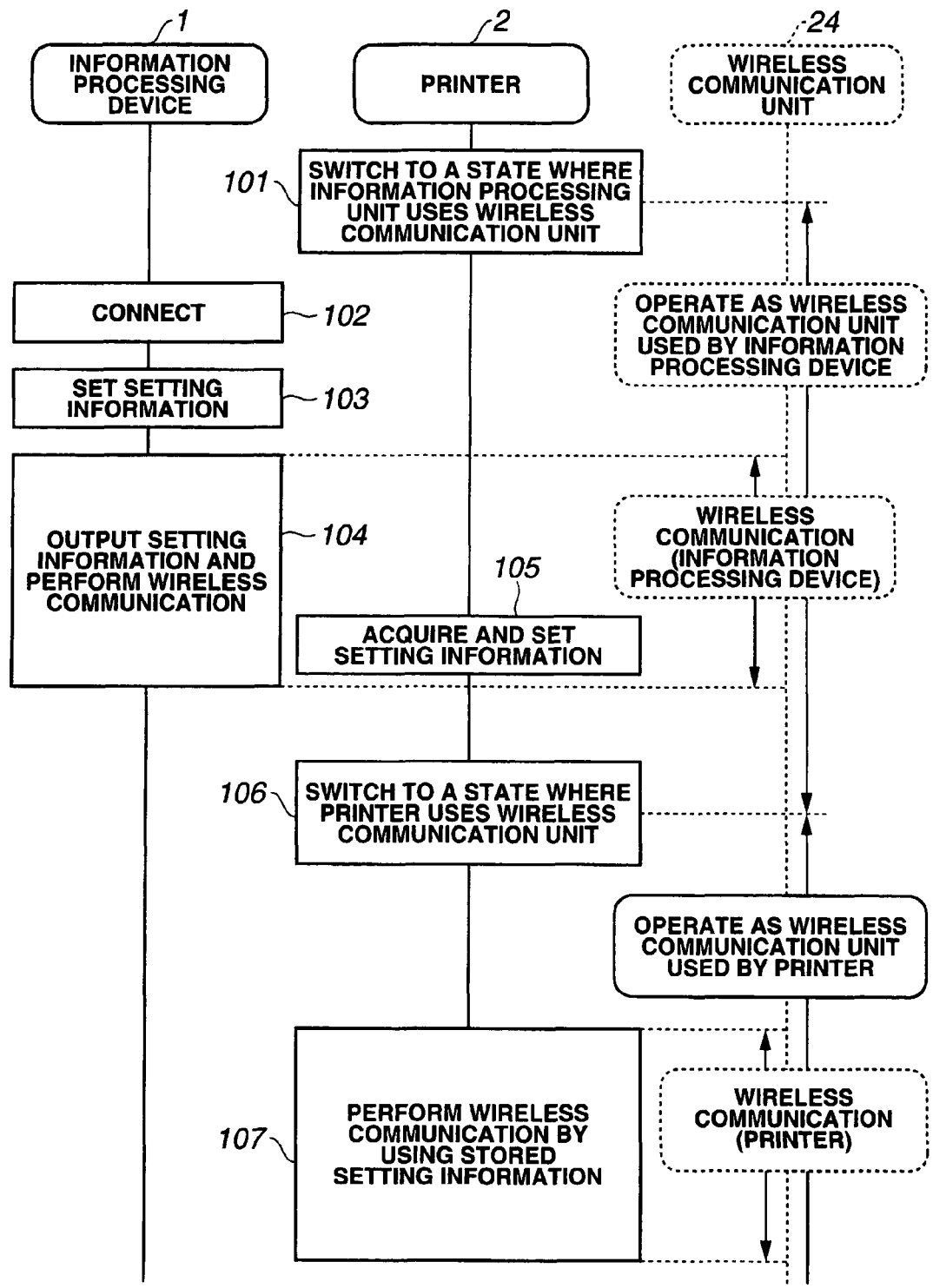
FIG. 5 is a diagram for explaining the flow of operations of the printer 2.

A description will be made of the flow of operations of the printer 2. FIG. 5 is a flowchart for explaining the flow of operations of the printer 2.

When the printer 2 is enabled to use wireless communication, the user manipulates an operating unit (not shown of the printer 2 to switch the printer 2 to a state where the information processing device 1 uses the wireless communication unit 24 (step 101). This switching is performed by switching the connection of the switching unit 21 and the connection of the switching unit 23 to the communication processing relay unit 22. However, when a USB or the like is used for the connector 20 to eliminate the need of switching thereof, only the switching unit 23 may be switched to the communication processing relay unit 22. The wireless communication unit 24 thus operates as a wireless communication unit of the information processing device 1 (the device connected through the connector 20).

The user then connects the information processing device 1 to the printer 2 (step 102), and sets setting information (WEP key or ESS-ID) required for wireless communication through the information processing device 1 (step 103). This setting is performed by the wireless setting unit 10. The wireless setting unit 10 is realized either by utilizing a function of an operating system operating on the information processing device 1 (for example, wireless LAN (Local Area Network) setting function), or by installing a driver for wireless communication in the information processing device 1 and using this driver.

Upon completion of the setting, the user performs wireless communication using the wireless communication unit 24 from the information processing device 1 (step 104). During the execution of the wireless communication, the wireless communication processing unit 11 outputs setting information, which has been set by the wireless setting unit 10.

When the information processing device 1 performs wireless communication by using the wireless communication unit 24, the information acquisition unit 25 of the printer 2 acquires setting information from the contents of the communication, and the setting unit 26 sets this setting information in the setting information storing unit 27 (step 105).

Thereafter, the user manipulates operating unit (not shown) of the printer 2 to switch the printer 2 to a state where the printer 2 uses the wireless communication unit 24 (step 106). This switching is performed by switching the connection of the switching unit 21 and the connection of the switching unit 23 to the printer forming part 29 and the communication processing unit 28, respectively. However, when a USB or the like is used for the connector 20 to eliminate the need of switching thereof, only the switching unit 23 may be switched to the communication processing relay unit 28. This causes the wireless communication unit 24 to operate as a wireless communication unit of the printer 2.

When the printer 2 is switched to the state where the printer 2 uses the wireless communication unit 24, the printer 2 is enabled to perform wireless communication using the wireless communication unit 24. The wireless communication unit 24 utilizes setting information stored in the setting information storing unit 27 to perform wireless communication (step 107).

The description of the exemplary embodiment 1 above has been made of a case in which the present invention is applied to a printer. However, the present invention is also applicable to various other peripheral apparatuses such as a scanner and a disk drive as long as they can be used on a network to realize wireless communication. In this case, the printer forming part 2e shown in FIG. 2 and the printer forming part 29 shown in FIG. 3 are replaced with a functional part forming the peripheral apparatus, such as a scanner forming part or a disk drive forming part, while the other configuration remains the same.

Exemplary Embodiment 2

Figure 6:
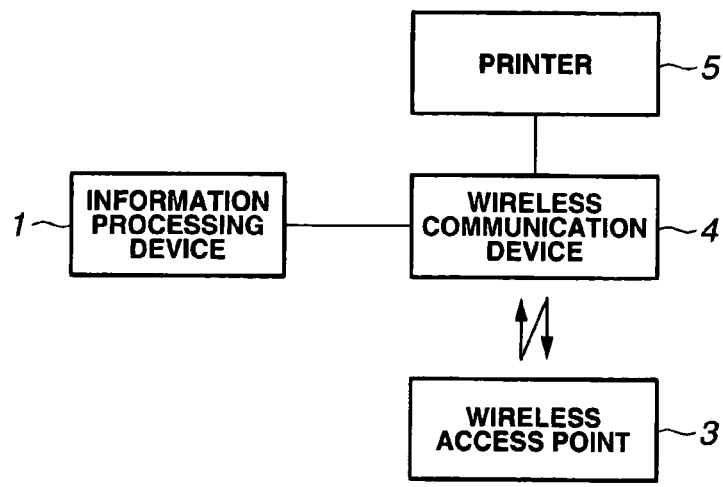
FIG. 6 is a diagram for explaining an outline of an exemplary embodiment 2.

FIG. 6 is a diagram for explaining outline of an exemplary embodiment 2. As shown in FIG. 6, in the exemplary embodiment 2, an information processing device 1 such as a personal computer, and an external device such as a printer 5 are connected to a wireless communication device 4 to which the present invention is applied, so that the external device such as the printer 5 is able to perform wireless communication with a wireless access point 3 via the wireless communication device 4.

Figure 7:
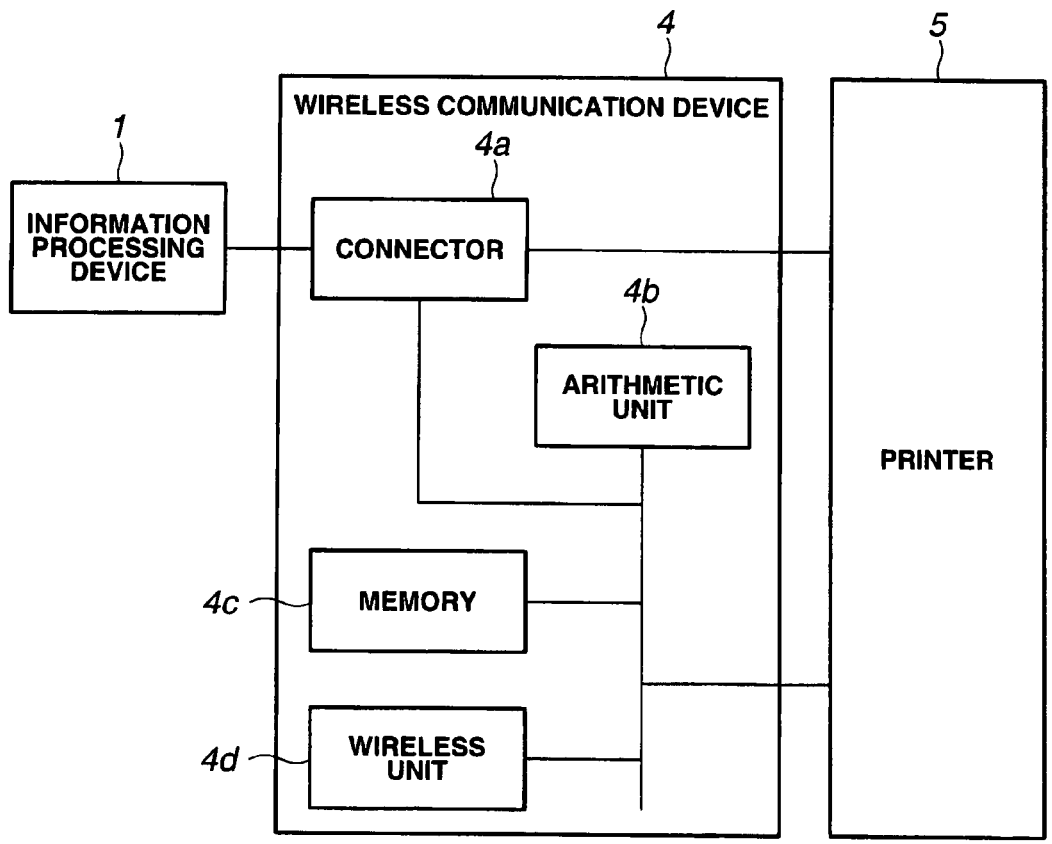
FIG. 7 is a block diagram illustrating configuration of a wireless communication device 4.

A description will be made of configuration of the wireless communication device 4. FIG. 7 is a block diagram showing configuration of the wireless communication device 4. As shown in FIG. 7, the wireless communication device 4 includes a connector 4a, an arithmetic unit 4b, a memory 4c, and a wireless unit 4d.

The connector 4a is an interface for connecting the wireless communication device 4 to the information processing device 1 and the external device such as the printer 5. The arithmetic unit 4b is for performing arithmetic processing and is realized by a processor such as a CPU. The memory 4c is for storing information and the like, and is realized for example by a memory such as an ROM, RAM, or nonvolatile memory, or a magnetic disk. The wireless unit 4d is for performing wireless communication with the wireless access point 3 or the like, and includes an antenna, a transmission/reception circuit, and so on. The wireless communication device 4 realizes the functions as described below, by causing the arithmetic unit 4b to operate according to a program stored in the memory 4c.

The program stored in the memory 4c may be provided by storing the same in various memories or storage media such as optical disks or the like, or by distributing the same via a communication line.

Figure 8:
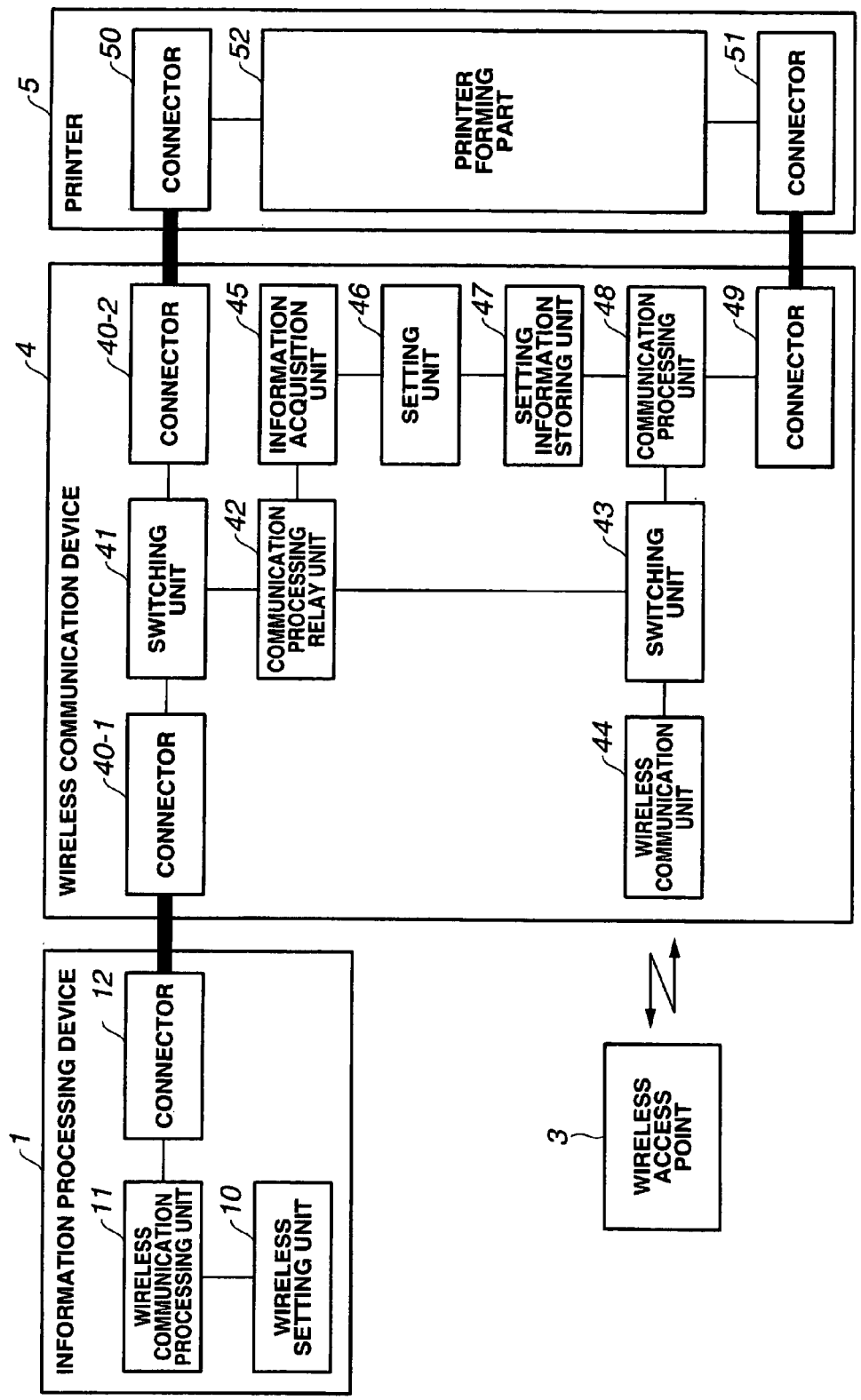
FIG. 8 is a block diagram illustrating functional configuration of the wireless communication device 4.

FIG. 8 is a block diagram showing functional configuration of the wireless communication device 4. As shown in FIG. 8, the wireless communication device 4 includes a connector 40-1, a switching unit 41, a connector 40-2, a communication processing relay unit 42, a switching unit 43, a wireless communication unit 44, an information acquisition unit 45, a setting unit 46, a setting information storing unit 47, a communication processing unit 48, and a connector 49. The information processing device 1 has a wireless setting unit 10, a wireless communication processing unit 11, and a connector 12. The printer 5 has a connector 50, a connector 51, and a printer forming part 52.

The connector 40-1 is an interface for connecting to the connector 12 of the information processing device 1. The switching unit 41 is for switching the connection with the information processing device 1 via the connector 40-1, between the communication processing relay unit 42 and the connector 40-2. When the connection is switched to the communication processing relay unit 42, the information processing device 1 is allowed to perform wireless communication, whereas when the connection is switched to the connector 40-2, the information processing device 1 is allowed to utilize the printer 5 connected to the connector 40-2 by the connector 50. This switching unit 41 may be a mechanical switch, or may be a switch operating on software.

When a USB is employed for the connector 12, the connector 40-1, and the connector 40-2, the information processing device 1 is allowed to use both wireless communication and the printer without the need of the switching unit 41.

The information processing device 1 is not necessarily able to use an external device such as the printer 5. Therefore, the connector 40-1 and the communication processing relay unit 42 may be connected directly to each other while omitting the switching unit 41.

The communication processing relay unit 42 is activated when the information processing device 1 uses the wireless communication unit 44. The communication processing relay unit 42 causes the wireless communication unit 44 to operate based on setting information such as a WEP key or ESS-ID output by the wireless communication processing unit 11 of the information processing device 1, so that the information processing device 1 is able to perform wireless communication with the wireless access point 3 by using the wireless communication unit 44. The setting information output by the wireless communication processing unit 11 of the information processing device 1 is set by the wireless setting unit 10 and stored by the wireless communication processing unit 11.

When the information processing device performs wireless communication by using the wireless communication unit 44, the information acquisition unit 45 acquires setting information such as a WEP key or ESS-ID utilized for the wireless communication. The setting unit 46 causes the setting information storing unit 47 to store the setting information acquired by the information acquisition unit 45.

The communication processing unit 48 operates when the external device such as the printer 5 connected to the connector 49 uses the wireless communication unit 44. The communication processing unit 48 causes the wireless communication unit 44 to operate based on the setting information stored in the setting information storing unit 47, so that the external device such as the printer 5 is able to perform wireless communication with the wireless access point 3 by using the wireless communication unit 44.

The switching unit 43 switches the connection with the wireless communication unit 44 between the communication processing relay unit 42 and the communication processing unit 48. This switching unit 43 may be a mechanical switch, or may be a switch operating on software. The wireless communication unit 44 uses the setting information to perform wireless communication with the wireless access point 3. When the information processing device 1 uses the wireless communication unit 44, the wireless communication unit 44 utilizes the setting information output by the wireless communication processing unit 11, whereas when the external device such as the printer 5 uses the wireless communication unit 44, the wireless communication unit 44 utilizes the setting information stored in the setting information storing unit 47.

The connector 49 is an interface for connecting to the connector 51 of the printer 5, and is for example an interface for LAN (Local Area Network).

A description will be made of the flow of operations of the wireless communication device 4. Operation of the wireless communication device 4 is substantially the same as the operation of the printer 2 described in the exemplary embodiment 1. Therefore, the description will be made with reference to FIG. 5, while, however, the printer 2 in FIG. 5 is replaced with the wireless communication device 4.

In order to enable the printer 5 to perform wireless communication, the user manipulates an operating unit (not shown) of the wireless communication device 4 to switch the wireless communication device 4 to a state where the information processing device 1 uses the wireless communication unit 44 (step 101). This switching is performed by switching the connection of the switching unit 41 and the connection of the switching unit 43 to the communication processing relay unit 42. However, when an USB or the like is used for the connector 40-1 to eliminate the need of the switching thereof, the switching unit 43 only is switched to the side of the communication processing relay unit 42. Thus, the wireless communication unit 44 is caused to operate as a wireless communication unit of the information processing device 1 (the device connected via the connector 40-1).

The user then connects the information processing device 1 to the wireless communication device 4 (step 102), and sets setting information (a WEP key, ESS-FD or the like) required for wireless communication through the information processing device 1 (step 103). This setting is performed by the wireless setting unit 10. The wireless setting unit 10 is realized by utilizing a function of the operating system operating on the information processing device 1 (for example, a wireless LAN setting function), or by installing a driver for wireless communication in the information processing device 1 and utilizing this driver.

Upon completion of the setting, the user performs wireless communication utilizing the wireless communication unit 44 through the information processing device 1 (step 104). When the wireless communication is performed, the wireless communication processing unit 11 outputs setting information, which has been set by the wireless setting unit 10.

When the information processing device 1 performs wireless communication by using the wireless communication unit 44, the information acquisition unit 45 of the wireless communication device 4 acquires setting information from the contents of the communication, and the setting unit 46 sets the acquired setting information in the setting information storing unit 47 (step 105).

The user then manipulates the operating unit (not shown) of the wireless communication device 4 to switch the wireless communication device 4 to a state in which the external device such as the printer 5 uses the wireless communication unit 44 (step 106). This switching is performed by switching the connection of the switching unit 41 and the connection of the switching unit 43 to the connector 40-2 and the communication processing unit 48, respectively. However, when a USB or the like is used for the connector 40-1 to eliminate the need of the switching thereof, only the switching unit 43 is switched to the communication processing unit 48. Thus, the wireless communication unit 44 is caused to operate as a wireless communication unit of the external device such as the printer 5.

When the wireless communication device 4 is switched to a state where the external device such as the printer 5 uses the wireless communication unit 44, the external device such as the printer 5 is enabled to perform wireless communication utilizing the wireless communication unit 44, and the wireless communication unit 44 performs wireless communication by using the setting information stored in the setting information storing unit 47 (step 107).

The description of the exemplary embodiment 2 above has been made of a case in which a printer as an external device is connected to the wireless communication device to which the present invention is applied. However, wireless communication can also be realized by connecting any other external device such as a scanner or a disk drive to the wireless communication device to which the present invention is applied, as long as the device can be connected for use on a network.

Exemplary Embodiment 3

In the exemplary embodiment 1 and the exemplary embodiment 2, the switching unit 23 and the switching unit 43 are activated to switch the destination of wireless communication. An exemplary embodiment 3 described below relates to a case in which the switching of the destination of wireless communication is not necessary. The following description of the exemplary embodiment 3 will be made of a case in which the configuration of the exemplary embodiment 1 is partially modified. However, it is also possible to provide configuration eliminating the need of switching the destination of wireless communication, by partially modifying the configuration of the exemplary embodiment 2.

The following description of the exemplary embodiment 3 will be made of a case in which the printer 2 having configuration as shown in FIG. 1 is replaced with a printer 6. The configuration of the printer 6 is similar to that of the printer 2 shown in FIG. 2, but the printer 6 uses a different program to operate the arithmetic unit 2b from that of the printer 2. This program can be provided by storing the same in various memories or storage media such as an optical disk, or by distributing the same through a communication line.

Figure 9:
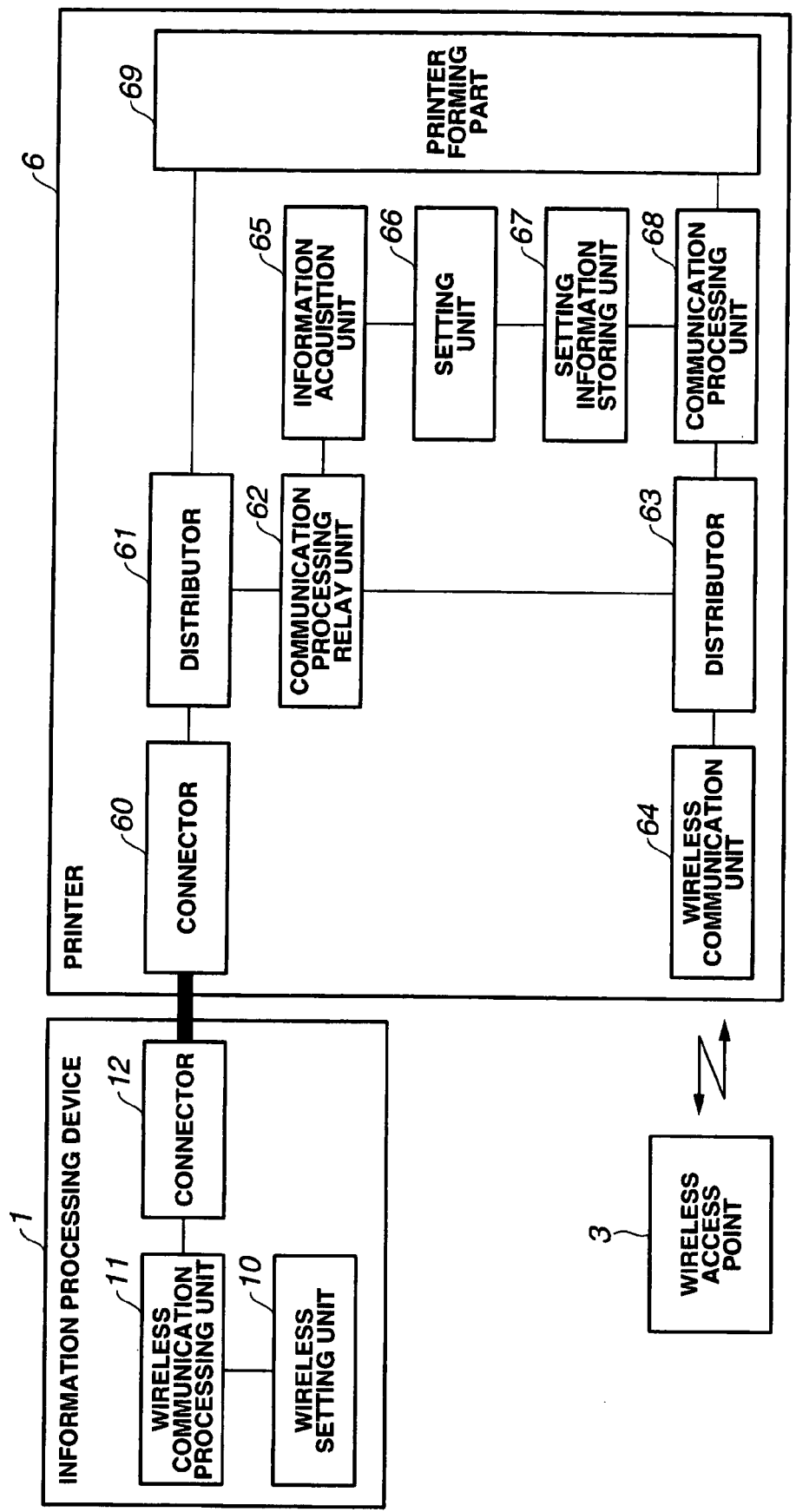
FIG. 9 is a block diagram illustrating functional configuration of the a printer 6.

FIG. 9 is a block diagram showing functional configuration of the printer 6. As shown in FIG. 9, the printer 6 includes a connector 60, a distributor 61, a communication processing relay unit 62, a distributor 63, a wireless communication unit 64, an information acquisition unit 65, a setting unit 66, a setting information storing unit 67, a communication processing unit 68, and a printer forming part 69.

The connector 60 is an interface for connecting to the connector 12 of the information processing device 1. The distributor 61 directs information received from the information processing device 1 connected via the connector 60, either to the communication processing relay unit 62 or to the printer forming part 69. This function can be realized for example by employing a USB port for the connector 60 and employing a USB hub for the distributor 61.

The information processing device 1 is not necessarily able to utilize the printer forming part 69. Therefore, the distributor 61 may be omitted, and the connector 60 may be directly connected to the communication processing relay unit 62.

The communication processing relay unit 62 operates when the information processing device 1 uses the wireless communication unit 64, and causes the wireless communication unit 64 to operate based on setting information such as a WEP key or ESS-ID output by the wireless communication processing unit 11 of the information processing device 1, so that the information processing device 1 is allowed to use the wireless communication unit 64 to perform wireless communication with the wireless access point 3. The setting information output by the wireless communication processing unit 11 of the information processing device 1 is information that has been set by the wireless setting unit 10 and stored in the wireless communication processing unit 11.

When the information processing device 1 performs wireless communication with the use of the wireless communication unit 64, the information acquisition unit 65 acquires setting information such as a WEP key or ESS-ID utilized for the wireless communication. The setting unit 66 causes the setting information storing unit 67 to store the setting information acquired by the information acquisition unit 65.

The communication processing unit 68 operates when the printer forming part 69 uses the wireless communication unit 64, and causes the wireless communication unit 64 to operate based on the setting information stored in the setting information storing unit 67, so that the printer forming part 69 is allowed to utilize the wireless communication unit 64 to perform wireless communication with the wireless access point 3.

The distributor 63 causes the wireless communication unit 64 to transmit information output from the communication processing relay unit 62 and the communication processing unit 68, and also directs information received from the wireless communication unit 64 either to the communication processing relay unit 62 or to the communication processing unit 68.

The printer 6 operates in the same manner as the printer 2 described in the exemplary embodiment 1 until the setting information is stored in the setting information storing unit 67. Therefore, the description thereof is omitted, and the following description will be made of operation of the distributor 63 which characterizes the printer 6.

Figure 10:
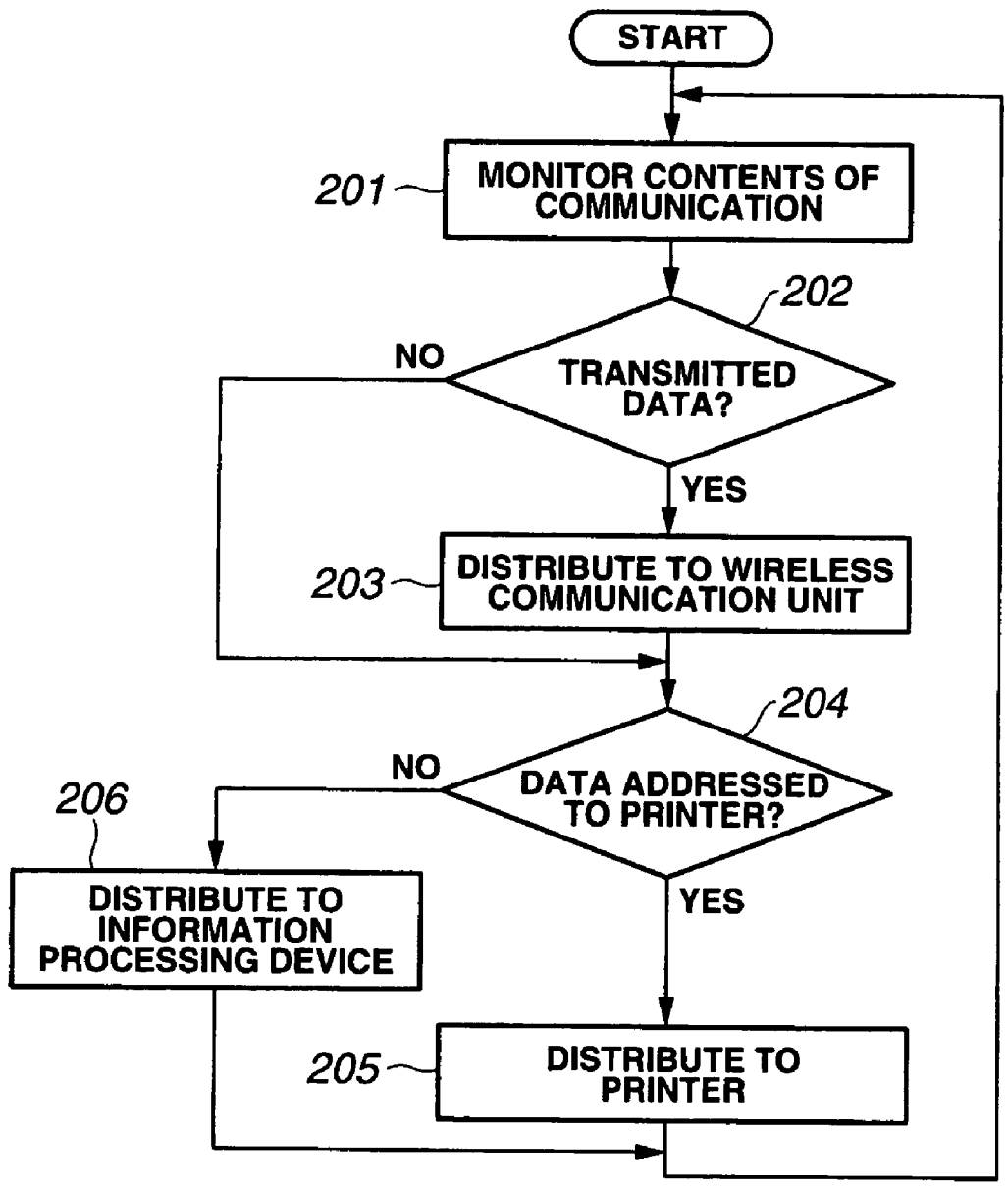
FIG. 10 is a flowchart illustrating the flow of operations of a distributor 63.

FIG. 10 is a flowchart showing the flow of operations of the distributor 63. The distributor 63 monitors the content of communication (step 201). If the content of communication is transmitted data, that is, data output by the communication processing relay unit 62 or the communication processing unit 68, the distributor 63 directs this data to the wireless communication unit 64 (step 202).

In contrast, if the content of communication is received data, that is, data output by the wireless communication unit 64, the distributor 63 determines its destination based on header information or the like of the data. If the data is addressed to the printer 6 (YES in step 204), the distributor 63 directs the data to the communication processing unit 68 (step 205), whereas if the data is addressed to the information processing device 1 (NO in step 204), directs the data to the communication processing relay unit 62 (step 206). When the wireless communication by the wireless communication unit 64 utilizes TCP/IP (Transmission Control Protocol/Internet Protocol), for example, this distributing of the received data can be performed by using a port number defined by TCP/IP. Thus, a relevant printer driver may be caused to operate so that the data addressed to the printer 6 utilizes the specific port number.

Although the description of the exemplary embodiment 3 has been made of a case in which the present invention is applied to a printer, wireless communication can be realized by applying the present invention to any other peripheral device such as a scanner or a disk drive, as long as the device can be connected for use on a network. In this case, the printer forming part 2e shown in FIG. 2 and the printer forming part 69 shown in FIG. 9 are replaced with a functional part forming the peripheral device such as a scanner forming part or a disk drive forming part, while the other configuration remains the same.

The forgoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A wireless communication printer comprising:
    a connector that is connected to an information processing device with a cable to enable exchange of a signal with the information processing device;
    an acquisition unit that acquires setting information when the information processing device connected to the connector performs wireless communication based on the setting information set in the information processing device;
    a storing unit that stores the setting information acquired by the acquisition unit;
    a wireless communication unit that performs wireless communication processing based on the setting information stored by the storing unit;
    a switching unit that switches a connection with the information processing device so that data received from the information processing device via the cable is either printed out or transmitted via the wireless communication unit; and
    a distributor that distributes data received by the wireless communication unit so that data is either printed out or transmitted to the information processing device, wherein
    the information processing device alone does not have a wireless communication unit which performs wireless communication with a wireless access point with use of setting information.

2. The wireless communication printer according to claim 1, wherein information received by the wireless communication unit is distributed on the basis of header information of the information either to the wireless communication printer if the information is addressed to the wireless communication printer, or to the information processing device if the information is addressed to the information processing device.

3. A non-transitory computer readable medium storing a program causing a wireless communication printer to execute a process for performing wireless communication, the process comprising:
    exchanging a signal with an information processing device that is wire-connected by a connector;
    acquiring setting information when the information processing device performs wireless communication based on the setting information set in the information processing device;
    storing the acquired setting information;
    performing wireless communication processing based on the stored setting information by operating a wireless communication unit;
    switching a connection with the information processing device so that data received from the information processing device via the cable is either printed out or transmitted via the wireless communication unit; and
    distributing data received by the wireless communication unit so that data is either printed out or transmitted to the information processing device, wherein
    the information processing device alone does not have a wireless communication unit which performs wireless communication with a wireless access point with use of setting information.

4. The non-transitory computer readable medium according to claim 3, wherein information received by the wireless communication unit is distributed on the basis of header information of the information either to the wireless communication device if the information is addressed to the wireless communication device, or to the information processing device if the information is addressed to the information processing device.

5. A non-transitory computer readable medium storing a program causing a wireless communication printer including a functional unit operating as a peripheral device to execute a process for performing wireless communication, the wireless communication device further including an information processing device also operating as a peripheral device, the process comprising:

exchanging a signal with an information processing device that is wire-connected by a connector;

acquiring setting information when the information processing device performs wireless communication based on the setting information set in the information processing device;

storing the acquired setting information;

performing wireless communication processing based on the stored setting information by operating a wireless communication unit;

switching a connection with the information processing device so that data received from the information processing device via the cable is either printed out or transmitted via the wireless communication unit; and distributing data received by the wireless communication unit so that data is either printed out or transmitted to the information processing device, wherein the information processing device alone does not have a wireless communication unit which performs wireless communication with a wireless access point with use of setting information.

6. The non-transitory computer readable medium according to claim 5, wherein information received by the functional unit is distributed on the basis of header information of the information either to the wireless communication device if the information is addressed to the wireless communication device, or to the information processing device if the information is addressed to the information processing device.

7. A wireless communication system comprising:
an information processing device; and
a wireless communication printer,
the information processing device comprising:
a setting unit that sets setting information used for wireless communication; and
a wireless communication processing unit that performs wireless communication processing via the wireless communication printer by using the setting information set by the setting unit, the wireless communication printer comprising:
a connector that is connected to the information processing device with a cable to enable exchange of a signal with the information processing device;

an acquisition unit that acquires setting information when the information processing device connected to the connector performs wireless communication based on the setting information set in the information processing device;

a storing unit that stores the setting information acquired by the acquisition unit;

a wireless communication unit that performs wireless communication processing based on the setting information stored by the storing unit;

a switching unit that switches a connection with the information processing device so that data received from the information processing device via the cable is either printed out or transmitted via the wireless communication unit; and a distributor that distributes data received by the wireless communication unit so that data is either printed out or transmitted to the information processing device, wherein the information processing device alone does not have a wireless communication unit which performs wireless communication with a wireless access point with use of setting information.

8. The wireless communication system according to claim 7, wherein information received by the wireless communication unit is distributed on the basis of header information of the information either to the wireless communication printer if the information is addressed to the wireless communication printer, or to the information processing device if the information is addressed to the information processing device.

* * * * *